United States Patent [19]
Cohen et al.

[11] Patent Number: 5,784,590
[45] Date of Patent: Jul. 21, 1998

[54] SLAVE CACHE HAVING SUB-LINE VALID BITS UPDATED BY A MASTER CACHE

[75] Inventors: Earl T. Cohen, Fremont; Jay C. Pattin, Redwood City, both of Calif.

[73] Assignee: Exponential Technology, Inc., San Jose, Calif.

[21] Appl. No.: 618,637

[22] Filed: Mar. 19, 1996

Related U.S. Application Data

[63] Continuation-in-part of Ser. No. 267,658, Jun. 29, 1994, Pat. No. 5,551,001.
[51] Int. Cl.$^6$ .................................................. G06F 12/08
[52] U.S. Cl. .................. 395/449; 395/473; 395/455; 395/450
[58] Field of Search ........................ 395/449, 473, 395/455, 450, 403

[56] References Cited

U.S. PATENT DOCUMENTS

| | | | |
|---|---|---|---|
| 4,860,192 | 8/1989 | Sachs et al. | 395/403 |
| 5,025,366 | 6/1991 | Baror | 395/455 |
| 5,131,083 | 7/1992 | Crawford et al. | 395/849 |
| 5,276,848 | 1/1994 | Gallagher et al. | 395/448 |
| 5,307,477 | 4/1994 | Taylor et al. | 395/403 |
| 5,325,504 | 6/1994 | Tipley et al. | 395/455 |
| 5,359,723 | 10/1994 | Mathews et al. | 395/449 |
| 5,367,660 | 11/1994 | Gat et al. | 395/403 |

*Primary Examiner*—Tod R. Swann
*Assistant Examiner*—J. Peikari
*Attorney, Agent, or Firm*—Stuart T. Auvinen

[57] ABSTRACT

A cache system has a large master cache and smaller slave caches. The slave caches are coupled to the processor's pipelines and are kept small and simple to increase their speed. The master cache is set-associative and performs many of the complex cache management operations for the slave caches, freeing the slaves of these bandwidth-robbing duties. Only the slave caches store sub-line valid bits with all cache lines; the master cache has only full cache lines valid. During a miss from a slave cache, the slave cache sends its sub-line valid bits to the master cache. The slave's sub-line valid bits are loaded into a request pipeline in the master cache. As requests are fulfilled and finish the pipeline, its address is compared to the addresses of all other pending requests in the master's pipeline. If another pending request matches the slave's index and tag, its sub-line valid bits are updated by setting the corresponding sub-line valid bit for the completing request's sub-line. If another pending request matches the slave's index but not the tag, all of the other request's sub-line valid bits are cleared. Thus subline valid bits of pending requests are updated as each request completes the master's pipeline and writes its sub-line to the slave cache.

21 Claims, 9 Drawing Sheets

CYCLE 1:

| TAG | LINE INDEX | STAGE | MISS ADDR | OLD SL VALID BITS (3:0) | CURRENT SUB-LINE (3:0) | |
|---|---|---|---|---|---|---|
| 6 | 0 | 1 | 0x3018 | 0000 | 1000 | |
| 0 | 1 | 2 | 0x0038 | 0010 | 1000 | <- INDEX, TAG MATCH SET SL VALID 2 |
| 0 | 0 | 3 | 0x0000 | 1110 | 0001 | |
| 0 | 1 | 4 | 0x0030 | 0010 | 0100 | |

OR
0110 IS NEW SL VALIDS

CYCLE 2:

| TAG | LINE INDEX | STAGE | MISS ADDR | OLD SL VALID BITS (3:0) | CURRENT SUB-LINE (3:0) | |
|---|---|---|---|---|---|---|
| 0 | 0 | 1 | 0x0018 | 0110 | 1000 | <- INDEX, TAG MATCH SET SL VALID 0 |
| 6 | 0 | 2 | 0x3018 | 0000 | 1000 | ·· INDEX MATCH, TAG MISS, CLEAR ALL SL VALIDS |
| 0 | 1 | 3 | 0x0038 | 0110 | 1000 | |
| 0 | 0 | 4 | 0x0000 | 1110 | 0001 | |

OR
1111 IS NEW SL VALIDS

FIG. 8A

CYCLE 3:

| TAG | LINE INDEX | STAGE | MISS ADDR | OLD SL VALID BITS (3:0) | CURRENT SUB-LINE (3:0) | |
|---|---|---|---|---|---|---|
| 0 | 1 | 1 | 0x0038 | 0111 | 1000 | ← INDEX, TAG MATCH SAME SUB-LINE (REDUNDANT) REMOVE REQ. |
| 0 | 0 | 2 | 0x0018 | 0110 | 1000 | |
| 6 | 0 | 3 | 0x3018 | 0000 | 1000 | |
| 0 | 1 | 4 | 0x0038 | 0110 | 1000 | |

OR → 1110 IS NEW SL VALIDS

CYCLE 4:

| TAG | LINE INDEX | STAGE | MISS ADDR | OLD SL VALID BITS (3:0) | CURRENT SUB-LINE (3:0) | |
|---|---|---|---|---|---|---|
| 6 | 0 | 1 | 0x3008 | 0000 | 0010 | ← INDEX, TAG MATCH SET SL VALID 3 |
| | | 2 | | | | |
| 0 | 0 | 3 | 0x0018 | 0110 | 1000 | |
| 6 | 0 | 4 | 0x3018 | 0000 | 1000 | ← INDEX MATCH, TAG MISS, CLEAR ALL SL VALIDS |

OR → 1000 IS NEW SL VALIDS

CYCLE 5:

| TAG | LINE INDEX | STAGE | MISS ADDR | OLD SL VALID BITS (3:0) | CURRENT SUB-LINE (3:0) | |
|---|---|---|---|---|---|---|
| 0 | 0 | 1 | 0x0010 | 0000 | 0001 SD | INDEX, TAG MATCH BUT DATA SLAVE NOT INSTR. SLAVE: IGNORE |
| 6 | 0 | 2 | 0x3008 | 1000 | 0010 SI | |
| | | 3 | | | | ← INDEX MATCH, TAG MISS, CLEAR ALL SL VALIDS |
| 0 | 0 | 4 | 0x0018 | 0000 | 1000 SI | |

OR → 1000 IS NEW SL VALIDS

FIG. 8B

SLAVE CACHE HAVING SUB-LINE VALID BITS UPDATED BY A MASTER CACHE

BACKGROUND OF THE INVENTION—RELATED APPLICATION

This is a continuation-in-part (CIP) of "Master-Slave Cache System", Ser. No. 08/267,658, filed Jun. 29, 1994 now U.S. Pat. No. 5, 551,001.

BACKGROUND OF THE INVENTION—FIELD OF THE INVENTION

This invention relates to cache memory systems, and more particularly to a master-slave cache system having sub-line validity in the slave cache.

BACKGROUND OF THE INVENTION—DESCRIPTION OF THE RELATED ART

On-chip caches are becoming more of a bottleneck to processor performance. They need to be larger and more complex because the off-chip miss penalty is becoming relatively higher. Processor technology allows for rapid increases in pipeline speed but off-chip memory access times have been unable to achieve commensurate speed increases. Larger, more complex caches are not as fast as smaller, simpler caches, and may not be able to match the processor's pipeline clock rate and maximum bandwidth.

A memory hierarchy is often set up, in which a few small registers lie within the microprocessor core. A small level-1 cache memory is placed on the microprocessor die, and a level-2 cache memory on the system board, with dynamic RAM (DRAM) comprising the large main memory. Maintaining coherency between each of these levels in the memory hierarchy can be difficult and can slow down the cache memories. Prefetching of instructions can also increase the complexity of the cache and slow down the cache.

The trend in recent years has been to put a level-1 cache on the microprocessor die. As the processor pipeline becomes faster, the level-1 cache size has been increased to increase the hit rate of the level-1 cache. A high hit rate is necessary because the miss penalty is high, requiring that a slower off-chip level-2 cache or main memory be accessed. Often the level-1 cache is made multi-way set-associative to improve its hit rate. This has led to larger and more complex on-chip caches. However, the larger and more complex the cache becomes, the more difficult it becomes to make the cache fast enough to meet the bandwidth of the processor pipelines.

Sub-Line Validity Expensive

Caches are organized as one or more associate sets, with each set being composed of cache lines. All data within a cache line share the same tag portion of an address. The cache line is usually several times larger than the amount of data that can be transferred in one cycle. If a single valid bit is provided for the entire line, then all the data in the cache line must be transferred into the cache before the cache line can be marked as valid. Another approach is to provide many valid bits for data in the cache line. Each valid bit indicates whether a portion of the cache line is valid, the portion being called a sub-block or a sub-line. Typically the size of the sub-line is equal to the amount of data that is transferred in one cycle. For example, a 64-bit data path to and from the cache usually has a 64-bit (8-byte or doubleword) sub-line. If the cache line is 32 bytes, then there are four sub-lines for each cache line, and four sub-line valid bits are needed for each cache line.

The sub-line valid bits can add significantly to the cost of a cache. This is especially true for larger caches. As an example of this added cost for sub-line validity, consider a 32K-bytes cache with 32-byte lines. This cache has 1K tags for its 1K cache lines.

With no sub-line validity, just one valid bit is needed for each cache line, for a total of 1K valid bits. When each 32-byte cache line is divided into four 8byte sub-lines, a total of four valid bits are needed for each cache line, one valid bit for each sub-line. Thus 4K valid bits are needed for the cache with sub-line validity. The extra 3K valid bits amounts to a 14% increase in tag-RAM size for a 32-Kbyte, 8-way set-associative master cache. If the MESI protocol is used, then MESI bits are also needed for each cache line.

Sub-Line Validity Allows Cache-Line Transfers to be Interrupted

Sub-line validity has an important benefit: data transfers can be interrupted before the entire cache line has been transferred. Often a cache line begins to be transferred when a new request occurs. This request might be a high-priority request such as fetching the target of a branch instruction. Waiting for the original cache line to be fully transferred would halt the processor's execution. Instead the transfer of the original cache line is interrupted so that the target of the branch instruction may be transferred as quickly as possible.

The original cache line that had its transfer interrupted has some of the sub-lines marked as valid while other sub-lines are marked as invalid. The remaining sub-lines can be retrieved later to make the entire line valid, or they may not be necessary and can be left as invalid. In the case of a taken branch interrupting the transfer of an original cache line containing instructions, other sub-lines of the original subline are not immediately needed since the processor begins to fetch instructions from another point in memory.

One way to allow cache-line transfers to be interrupted without providing sub-line valid bits for each cache line is to provide extra hardware such as address buffers and subline valid-bit trackers to keep track of the interrupted transfers. However, this allows only a limited number of cache-line transfers to be interrupted. An arbitrary number of cache lines in arbitrary states is not possible. A more general approach is desired.

What is desired is to provide both sub-line validity and the ability to interrupt an arbitrary number of cache-line transfers, but without the cost of adding sub-line validity to a large cache. A caching scheme is desired that provides the benefits of large on-chip caches with low miss rates, but also offers the speed advantage of small, simple caches. It is also desired to provide for complex cache management operations such as prefetching, bus snooping, and cache coherency without creating a bottleneck for the processor's pipelines.

SUMMARY OF THE INVENTION

A cache system has a master cache and a slave cache. The master cache has a plurality of master cache lines, and each master cache line has all sub-lines of data valid for access or all sub-lines of data not valid for access. The slave cache is coupled to the master cache and to a processor. It has a plurality of slave cache lines with each slave cache line having a plurality of sub-lines of data individually marked valid or invalid by sub-line valid bits for each slave cache line.

A slave miss requester detects when a requested data item is not present in the slave cache. It transmits a miss address and sub-line valid bits from the slave cache to the master cache. A transfer pipeline in the master cache receives the miss address and the sub-line valid bits from the slave miss requester. The transfer pipeline reads the requested data item from the master cache and updates the sub-line valid bits.

A slave writer receives the miss address, the requested data item, and the sub-line valid bits updated by the transfer pipeline. It writes the requested data item, a tag portion of the miss address, and the sub-line valid bits updated by the transfer pipeline to a selected cache line in the slave cache. The selected cache line is selected by a slave-index portion of the miss address.

Although the master cache does not have sub-line validity, the master cache updates the sub-line valid bits received from the slave cache and has updated sub-line valid bits written back to the slave cache with the requested data item.

In further aspects of the invention the transfer pipeline in the master cache includes compare means for comparing in parallel a slave-index portion of the miss address for a request in the transfer pipeline to slave-index portions of other requests in the transfer pipeline. The transfer pipeline updates the sub-line valid bits when the compare means detects a match in the slave-index portions.

In still further aspects the slave cache is a direct-mapped cache while the master cache is a set-associative cache. The master cache is larger than the slave cache. The master cache processes all external snoop request which hit in the slave cache by writing an invalid cache line to the slave cache. The invalid cache line has all sub-line valid bits marked as invalid.

BRIEF DESCRIPTION OF THE DRAWINGS

FIGS. 8A and 8B show various requests flowing down the master cache's pipeline, with the slave's sub-line valid bits being updated.

DETAILED DESCRIPTION

The present invention relates to an improvement in cache organization. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

MASTER-SLAVE CACHE ARRANGEMENT

The parent application for a "Master-Slave Cache System" U.S. Ser. No. 08/267,658, now U.S. Pat. No. 5,551,001, hereby incorporated by reference, first disclosed a master-slave cache arrangement. A large, set-associative master cache supplies instructions and operands to smaller direct-mapped slave caches for the processor's data and instruction pipelines. Complex logic for cache coherency, snooping, zeroing and invalidations is provided in the master cache but not in the slave caches. The master cache's tags include slave valid bits which indicate that a copy of the data is located in the slave cache. Data in the slave caches can be invalidated by the master cache if the master cache determines that the data also resides in a slave cache.

A master-slave cache on the same substrate or die with a microprocessor can supply the maximum bandwidth of the processor's pipelines while being large enough to have a low miss rate. The cache is arranged as a large master cache which controls two smaller slave caches, one slave instruction cache for supplying the instruction pipeline with instructions, and a second slave data cache for supplying data operands to the execution pipeline.

Figure 1:
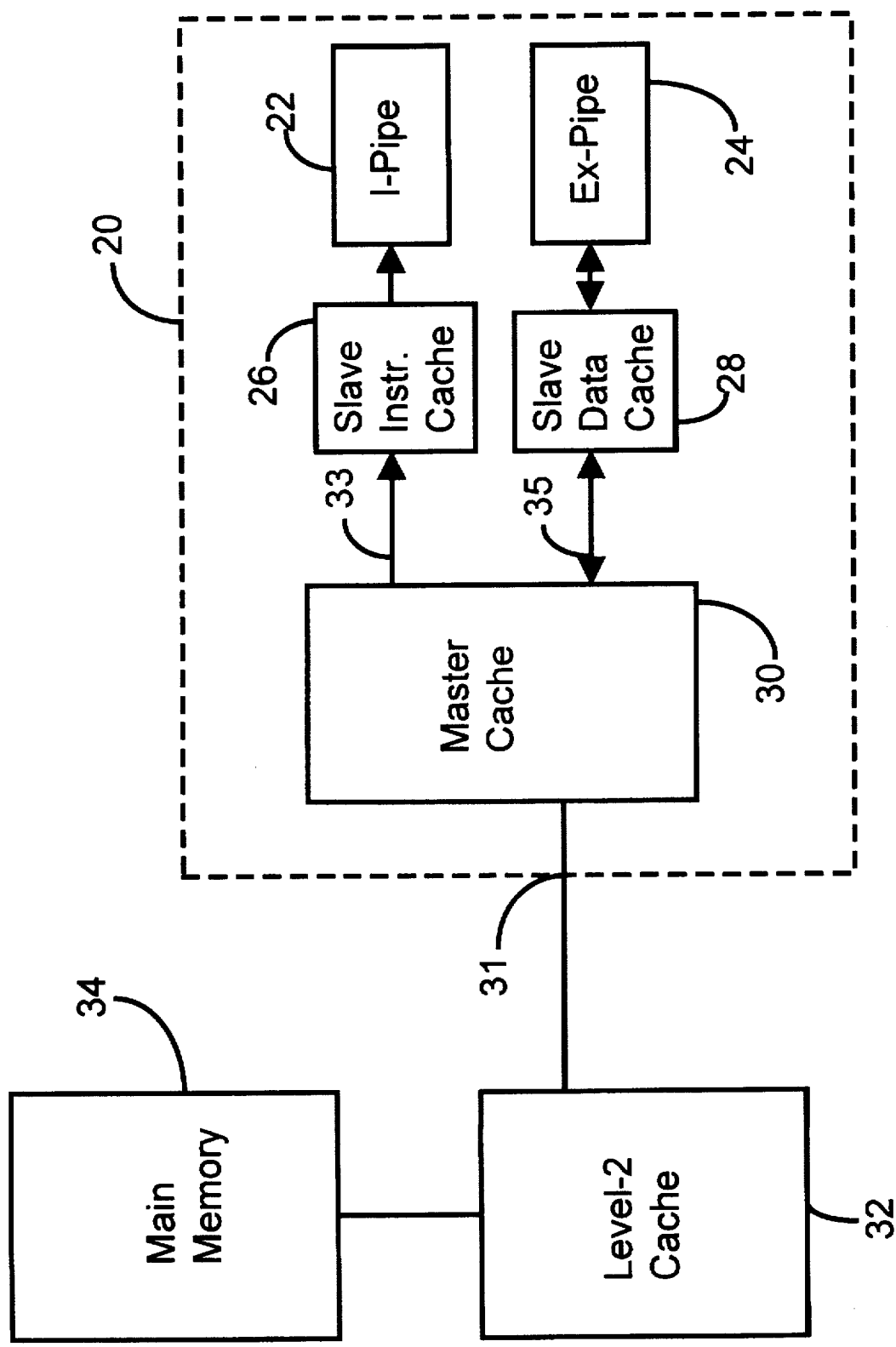
FIG. 1 illustrates a microprocessor employing the master-slave cache.

FIG. 1 illustrates a microprocessor substrate or die 20 containing the master-slave cache. Instruction pipeline 22 is supplied with instructions by slave instruction cache 26. The instruction pipeline 22 is clocked by a processor or pipeline clock. The pipeline clock controls the transfer of instructions from one stage of the pipeline to the next. One or more instruction words must be provided for each processor clock period. Although the instruction pipeline 22 may stall, or occasionally require more than one processor clock period for an instruction word, the maximum or full bandwidth when no stalls occur is n instruction words per processor clock period, where n is the level of scalarity. Thus the slave instruction cache 26 must supply the instruction pipeline 22 with at least n instruction words per processor clock period if the full bandwidth of the processor is to be achieved. A super-scalar processor capable of executing 2 instructions per clock period would have n=2.

A simplified embodiment is described having a single instruction pipeline and a single execution pipeline. However, most modern processors employ super-scalar designs. Super-scalar CPU's have several pipelines. A three-way super-scalar embodiment would require three instructions for each clock period to supply three pipelines. If two of the pipelines are execution pipelines capable of executing memory operations, then two data operands may also need to be supplied for each clock period. The teachings of the detailed description are restricted to a simple CPU having a single execution pipeline and a single instruction pipeline. These teachings may however be extended to multiple pipelines by persons skilled in the art.

The execution pipeline 24 is supplied with operands from slave data cache 28. In one embodiment of the invention execution pipeline 24 may also store data operands into slave data cache 28; these data operands are then written through to master cache 30. Master cache 30 provides all the cache management necessary for itself and the slave caches 26, 28. Slave caches 26, 28 need only have a valid bit with each tag which is set and cleared by the master cache 30. Prefetching, handling external snoop requests, coherency operations, and cache flushes are all accomplished by the master cache. Thus the slave caches 26, 28 may be kept simple, allowing for a fast access time and a high bandwidth. Master cache 30 is significantly larger and more complex than would be possible if it were to directly supply the processor's pipelines 22, 24. Directly supplying the pipelines in a single processor clock requires a fast access time. Slave caches 26, 28 are small, fast and simple, and are preferably implemented as RAM-based, direct-mapped caches, while master cache 30 is preferably RAM-based and set-associative. Master cache 30 preferably has four or more times the capacity of both the slave caches 26, 28. Master cache 30 may require multiple processor clock periods to access its contents, while the slave caches 26, 28 are small enough to supply the required data operand and instruction words each processor clock period.

An additional level-2 cache 32 may be provided on the system board off the microprocessor die 20, or the level-2 cache 32 may be omitted, and misses from the master cache passed on to the main memory 34 on the system board. The high-bandwidth benefit of the Harvard architecture is obtained because the slave instruction cache 26 and slave data cache 28 can supply both pipelines 22, 24 as do split instruction and data caches of the Harvard architecture. However, two sets of address and data buses and pins are not required. If the prior-art Harvard architecture is used with only a single set of pins, the pins must be multiplexed between the two caches. The two caches must be made large so that the miss rate is small, otherwise the two caches will be contending for the multiplexed pins frequently, causing one cache to have to wait. However, the larger cache sizes reduces the clock rate and bandwidth that can be supplied to the processor core. The prior-art Harvard architecture is thus stuck between the trade-off of larger size and lower bandwidth, or smaller cache size and higher bandwidth but pin contention or die cost.

In the invention, master cache 30 provides more functionality than is the case by merely integrating an additional level of caching on the microprocessor die 20. Master cache 30 is tightly coupled to slave caches 26, 28 and can relieve the slave caches 26, 28 from burdensome cache management operations such as coherency and snooping. In the Harvard architecture, coherency between instruction cache and data cache is difficult and may require that clock cycles be taken that would otherwise be used to supply the pipelines 22, 24. In the invention, the master cache 30 absorbs these coherency requests, freeing the slave caches to supply the processor's pipelines.

Additionally, the slave caches 26, 28 may be physically located in close proximity to the pipelines 22, 24. Thus slave instruction cache 26 is located near to the instruction pipeline 22, while the slave data cache 28 is located near the execution pipeline 24. The larger master cache 30 may then be located at a greater distance from the pipelines 22, 24 and the core CPU logic. This simplifies floor-planning and layout of the microprocessor die 20, and results in faster access times for transferring instructions and data from the slave caches 26, 28 to the pipelines 22, 24. In prior-art systems, the large cache sizes required that any cache be located away from the CPU core and the pipelines.

Only a single set of address and data busses are needed for communicating with external caches and memories. Pins 31 connect the master cache 30 with the external level-2 cache 32, whereas on some prior-art systems a single set of pins had to be multiplexed. Not having to multiplex the pins reduces contention and complexity. A larger, wider data path may be used between the master cache 30 and the slave caches 26, 28 since no connection is necessary for the slave-master busses 33, 35 to the external pins of the microprocessor die 20. Slave-master busses 33, 35 may be each separately optimized for the bandwidth required by the particular slave cache and pipeline.

Since the bulk of the capacity of the cache lies in the master cache 30 rather than the slave caches 26, 28, the benefits of the unified cache result. A higher hit rate is achieved than if the master cache were split into two separate half-size caches, and the master cache provides flexibility and adaptability by being able to place either instruction or data words in any line in the cache, allowing the portion of the cache allocated to either data or instructions to vary as needed by the programs currently executing on the processor. The master cache may be implemented in slower, denser, and lower-power memory than the slave caches, saving power, space and cost while maintaining a high hit rate.

MASTER TAGS INCLUDE SLAVE VALID BITS

Figure 2:
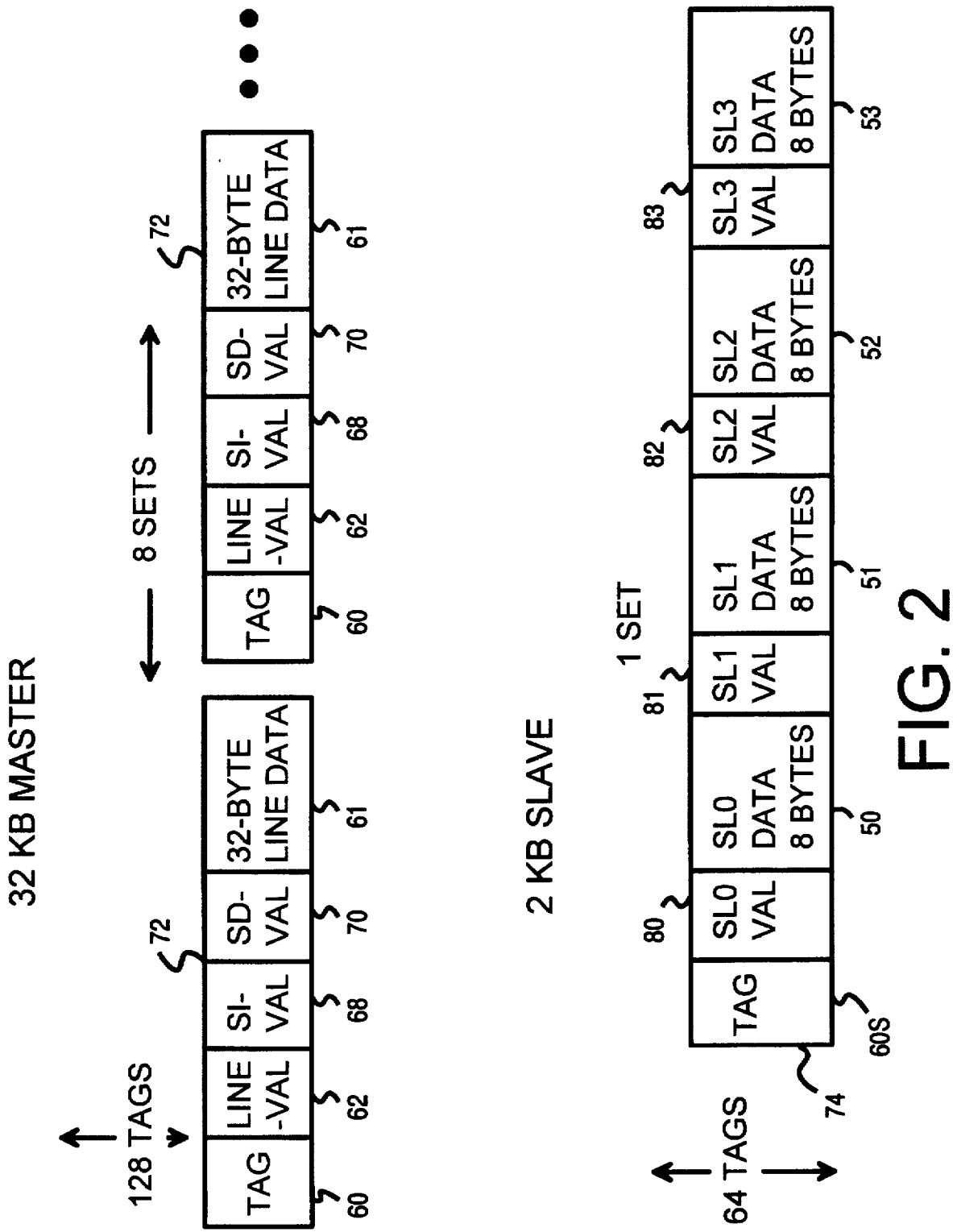
FIG. 2 shows the tags stored with each line in the master-slave cache with line valid bits in the master and sub-line valid bits in the slaves.

FIG. 2 shows the tags stored with each line in the master-slave cache with line valid bits in the master and sub-line valid bits in the slaves. A master line 72 is stored for each line in the master cache 30. An address tag 60 stores a portion of the address of the data stored in the line. Data fields 61 of the line are well-known in the art and can take on many arrangements. The data stored may be either data operands, instructions, or translation or other system information. A master valid bit 62 is used to indicate if the line in the master cache 30 contains valid data. Master valid bit 62 does not provide sub-line validity; only an entire line in master cache 30 can be valid. Other bits described in the parent application include a modified bit, an exclusive bit, and LRU bits. An approach for line replacement is to force the set-associates in the master cache that have a slave valid bit set to be the most-recently-used set-associates. The exclusive encoding is particularly useful in multi-processor systems and can be used to help implement the MESI (modified, exclusive, shared, invalid) standard for cache-coherency.

Master line 72 also contains inclusion information for the slave caches 26, 28. SI Valid bit 68 indicates that at least some of the data in the master's cache line is also valid in the slave instruction cache, while SD valid bit 70 indicates that at least some of the data in the master's cache line is also valid in the slave data cache. Thus the master cache has information on the contents of the slave caches.

The master cache contains three valid bits:

1. The master valid bit 62 which indicates if the line in the master cache is valid.
2. The SI valid bit 68 for the slave instruction cache.
3. The SD valid bit 70 for the slave data cache.

The master cache always contains inclusion information for any lines in the slave caches; it is not permitted for the slave caches to have lines which are not present in the master cache. By also having the slave-cache valid bits, the master can perform complex coherency operations such as snoops, invalidations, and zeroing, required by many modern architectures, without needlessly disturbing the slave caches.

While there are two slave caches, a slave instruction cache and a slave data cache, just one slave cache is shown in FIG. 2 for clarity. Slave line 74 includes address tag 60S, which may contain more address bits than the address tag 60 in the master cache because a smaller index width may be needed to access the fewer lines in the slave caches.

The data stored in slave line 74 is divided into four sublines 50, 51, 52, 53 of 8 bytes each. Four sub-line valid bits 80, 81, 82, 83 are provided for indicating that each of the four sub-lines contain valid data. If the slave line's tag 60S is not valid, then none of the sublines 50, 51, 52, 53 of data can be valid and all four sub-line valid bits 80, 81, 82, 83 are marked invalid. Thus a separate line valid bit for indicating that slave tag 60S is valid is not needed, although it could be added.

Thus only valid bits for an entire cache line are provided in the master cache, but sub-line valid bits are provided in the slave caches. Since the master cache is much larger than the slave caches, the additional cost for providing sub-line validity is reduced compared to adding sub-line valid bits in the larger master cache.

SLAVE SENDS SUB-LINE VALID BITS TO MASTER ON A MISS

Because the master cache does not have sub-line valid bits describing which sub-lines are valid in each slave, data transfers to and from the master cache cannot be arbitrarily interrupted without penalty. To realize the benefit of arbitrarily interrupting transfers between the master and slave caches, the slave's sub-line valid bits are provided to the master on a slave miss. Thus the master is given the sub-line information when a transfer is requested. The master cache stores this sub-line information only for lines that are being transferred or have recently been interrupted. The master can then resume an interrupted transfer using the sub-line valid bits supplied by the slave cache.

Figure 3:
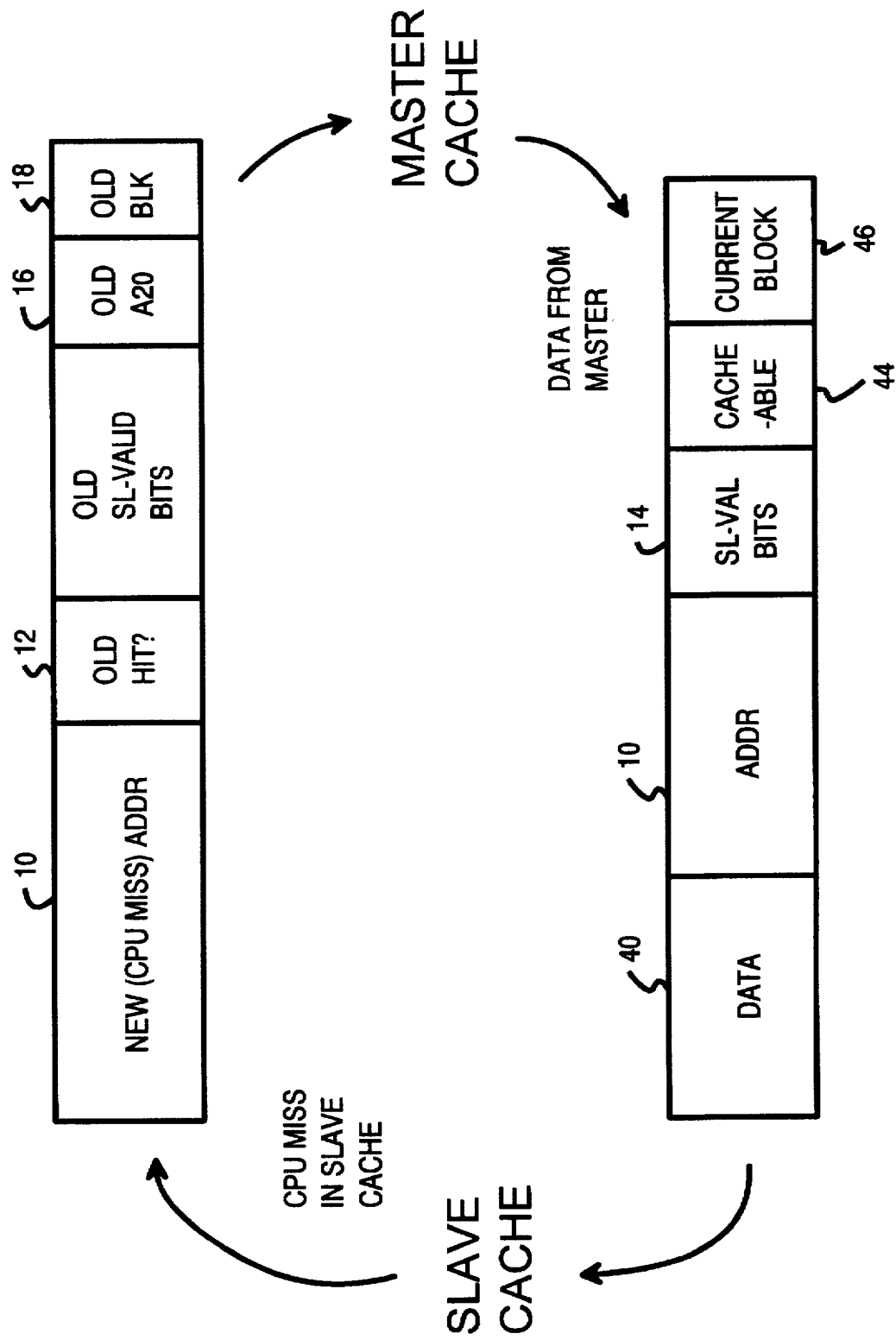
FIG. 3 illustrates sub-line valid bits from the slave cache being sent to the master cache on a miss.

FIG. 3 illustrates sub-line valid bits from the slave cache being sent to the master cache on a miss. When the CPU's execution pipeline requests an operand that is not present in the slave data cache, or the CPU's instruction pipeline or fetch unit requests an instruction that is not present in the slave instruction cache, a slave miss occurs. The operand or instruction must be fetched from the larger master cache, or possibly external memory.

The slave cache informs the master cache of the miss by sending the address of the missing operand or instruction from the CPU, miss address 10, to the master cache. Other information besides miss address 10 is sent from the slave cache. Since a read of the slave cache is first performed to determine if a miss occurs, the old sub-line valid bits 14 of the slave's line matching the slave-index of miss address 10 can be read out at the same time. These old sub-line valid bits 14 are especially useful when the tag matched the miss address 10, but the desired sub-line was not valid. Old hit bit 12 is set when the slave tag matches the miss address 10, but cleared when the slave tag does not match, and an entirely new line with a new tag must be written to the slave cache, replacing the old line.

The master cache reads its data array at miss address 10 and provides sub-line data 40 to the slave cache. Miss address 10 is sent back to the slave, and the slave's tag is over-written. When old hit bit 12 is cleared, the slave's tag is overwritten with a new tag value. However, when old hit bit 12 is set, the slave's tag is over-written with the same tag value since the slave's tag is always written in the preferred embodiment.

When old hit bit 12 is set, sub-line data 40 from the master cache is added to the other sub-lines of data of the existing line in the slave cache. The master cache takes the old sub-line valid bits 14 and sets the sub-line valid bit set for the new sub-line, generating the new sub-line valid bits 14'. However, when old hit bit 12 is cleared, the master cache clears all the old sub-line valid bits 14 and sets just the one sub-line valid bit for the new sub-line.

Other information may also be sent to and from the master. Cacheable bit 44 is cleared when data 40 should not be loaded into the slave cache but should be only sent to the CPU to satisfy the current miss. Cacheable bit 44 is useful as it allows the same interface to support cacheable and non-cacheable transfers.

Other optional information can be sent from the slave cache to the master to help the master find the old cache line in the master. For 2K byte slave caches and a larger master cache, old A20 is the address 20 bit from the slave's old tag. Old A20 from the slave's tag often differs from the A20 address bit in the miss address from the CPU. Address A20 is part of the slave's tag, but it is in the master's index, not the master's tag. Thus A20 selects one of two possible sets (indexes) in the master that map to the one slave cache index. The master can use A20 to find the old cache line and to clear the old slave valid bit (SI valid 68 or SD valid 70) when old hit bit 12 is cleared, indicating that an entirely new line will replace the old line in the slave.

Old block 18 can also be sent from the slave cache to the master to help the master cache locate the old cache line in the master cache. Old block 18 selects one of the associates (blocks) in the master cache, eliminating the need to compare tags for all associates in the master to find the old cache line. However, an old block field must be added to each tag in the slave caches, increasing the cost of the slave caches. For an 8-way set-associative cache, a 3-bit field is added to each slave cache line. Current block 46 is sent from the master cache to the slave cache along with miss address 10 and sub-line data 40. Current block 46 indicates which block in the master cache contains the sub-line data being sent to the slave cache. The slave cache stores this current block along with the tag. On a later miss this stored block number is read and sent back to the master cache as old block 18 to help the master located the old entry. The master cache clears the slave valid bits in this associate block when old hit bit 12 is cleared, indicating that the cache line in the slave is to be replaced. Thus the inclusion information in the master cache can be kept up-to-date.

Figure 4:
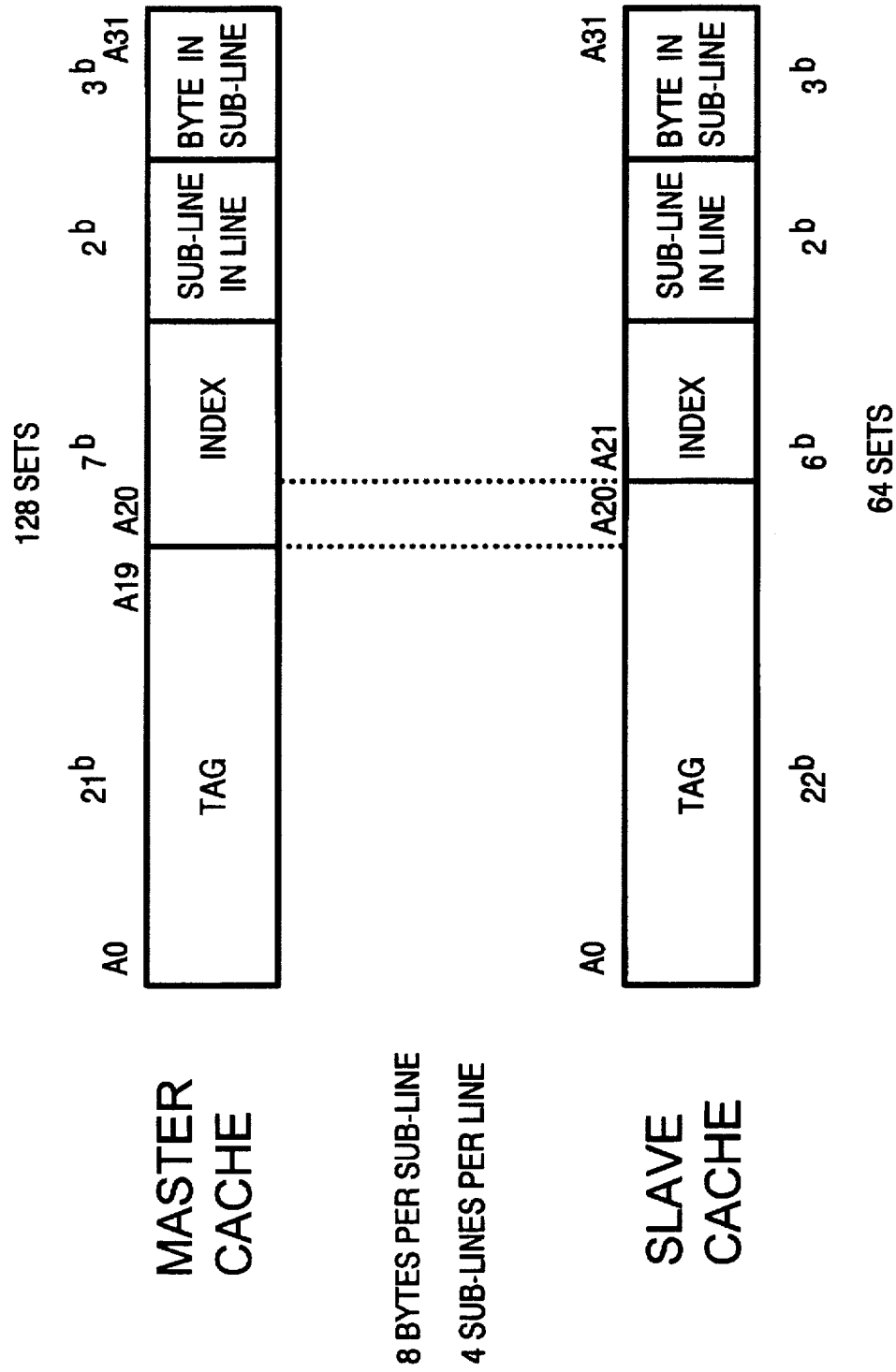
FIG. 4 highlights address bit A20, which is in the slave's tag, but the master's index.

FIG. 4 highlights address bit A20, which is in the slave's tag, but the master's index. For a 32-bit address, with A0 being the most-significant bit (MSB) and A31 being the least-significant bit (LSB), bits A29, A30, A31 select one of eight bytes in a sub-line, while bits A27, A28 select one of four sub-lines in a cache line. The index selects one cache line in a direct-mapped cache such as the slave caches, or one line in each block for a set-associative cache. The remaining upper bits are stored as the tag. Since the master has 128 tags in each block, seven index bits are needed ($2^7=128$). Thus A20 to A26 are the index address bits for the master, with bits A0 to A19 being tag address bits. Since the slave has only 64 sets or lines, only six index bits are needed ($2^6=64$). Thus A21 to A26 are the index address bits for the slaves, with bits A0 to A20 being tag address bits. Address A20 is therefore in the slave's tag, but in the master's index. A20 is sent from the slave's tag to the master's index on a slave miss, as shown in FIG. 3.

SLAVE'S SUB-LINE VALID BITS ARE PIPELINED IN MASTER CACHE

The description above is simplified for a master cache that immediately returns requested data to the slave cache. However, the master cache may require several cycles to respond to a request. A pipeline for the master cache may be set up to handle several outstanding transfers.

A pipeline of transfers from the master cache complicates the returning of the sub-line valid bits. This complication arises because a pending transfer in the master's pipeline may update the same cache line as does a new request from the slave. The sub-line valid bits received from the slave cache do not yet reflect the pending transfer in the master's pipeline. If this pending transfer is to the same line as the new slave request, the pending transfer updates the sub-line valid bits in the slave cache. Then when the new request is processed by the master cache, its sub-line valid bits are no longer current, having been read before the pending transfer updated the sub-line valid bits in the slave cache.

This problem of the sub-line valid bits from the slave cache being out-of-date due to pending transfers is solved by updating sub-line valid bits in the master's pipeline. The master's pipeline updates the slave's sub-line valid bits when a pending transfer completes the master's pipeline and is sent to the slave cache. Thus the effect of the pending request on the sub-line valid bits is accounted for.

Figure 5:
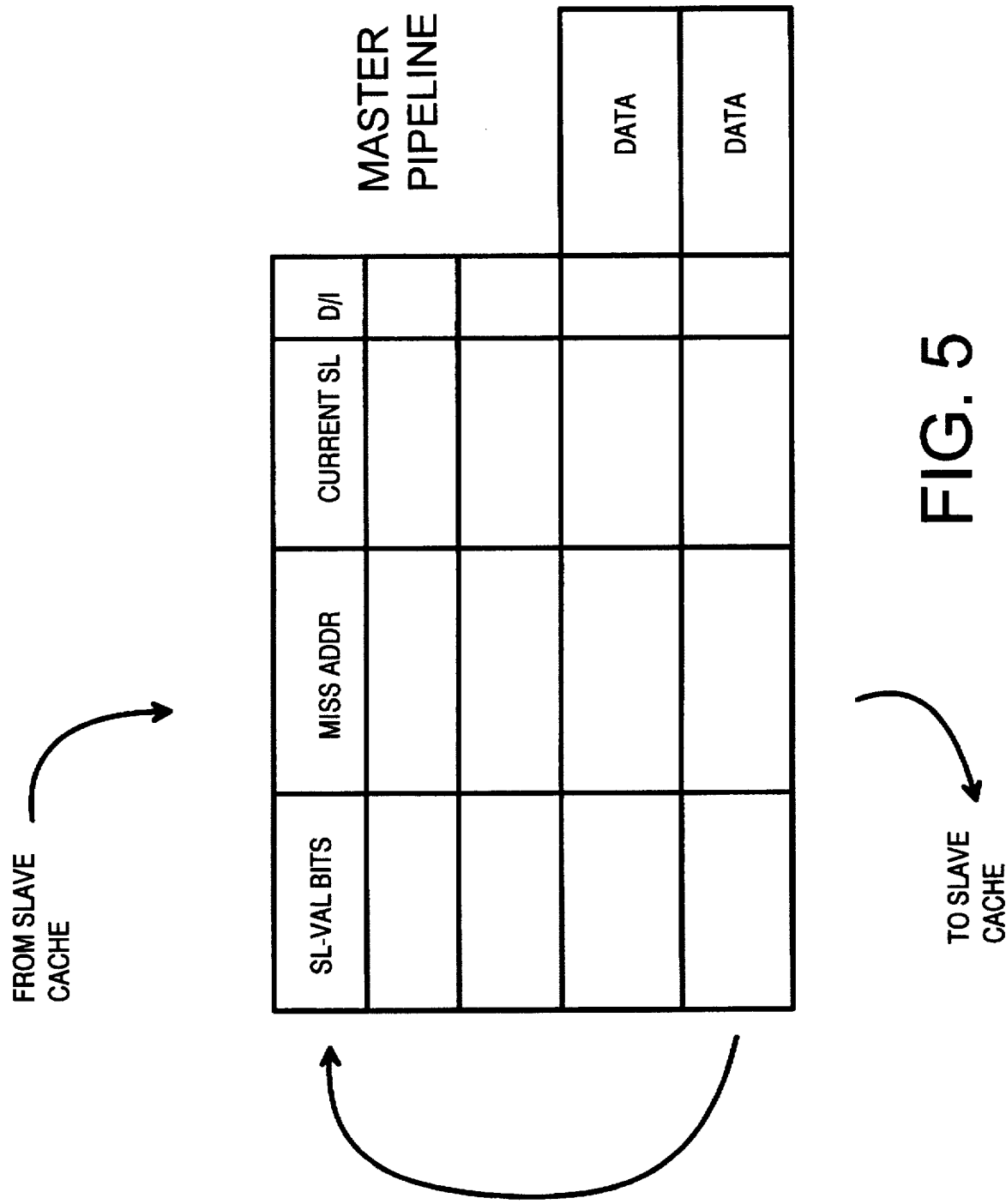
FIG. 5 illustrates in concept the master cache's pipeline of requests and sub-line valid bits from the slave caches.

FIG. 5 illustrates in concept the master cache's pipeline of transfers and sub-line valid bits from the slave caches. Requests from slave caches enter the top of the master's pipeline by loading into the pipeline's buffers the miss address, old sub-line valid bits, and other information sent from the slave to the master as described in FIG. 3. The source of the request, either the slave data cache or the slave instruction cache, is indicated by the D/I bit. Other sources such as snoop requests can also be encoded in other fields that are not shown.

The current sub-line field contains four sub-line valid bits with just the one sub-line valid bit for the miss address set; the other sub-line valid bits are always cleared in the current sub-line field. The current sub-line field is never altered or updated, as it depends only on the miss address. However, the old sub-line valid bits are updated by other pending requests in the pipeline. Since the current sub-line is redundant with the LSBs of the address, only one is strictly essential.

As requests travel down the master cache's pipeline, the tag and data arrays of the master cache are read, and the sub-line data retrieved. The retrieved sub-line data joins the miss address and updated sub-line valid bits late in the master cache's pipeline before being sent to the slave cache as a data transfer.

Figure 6:
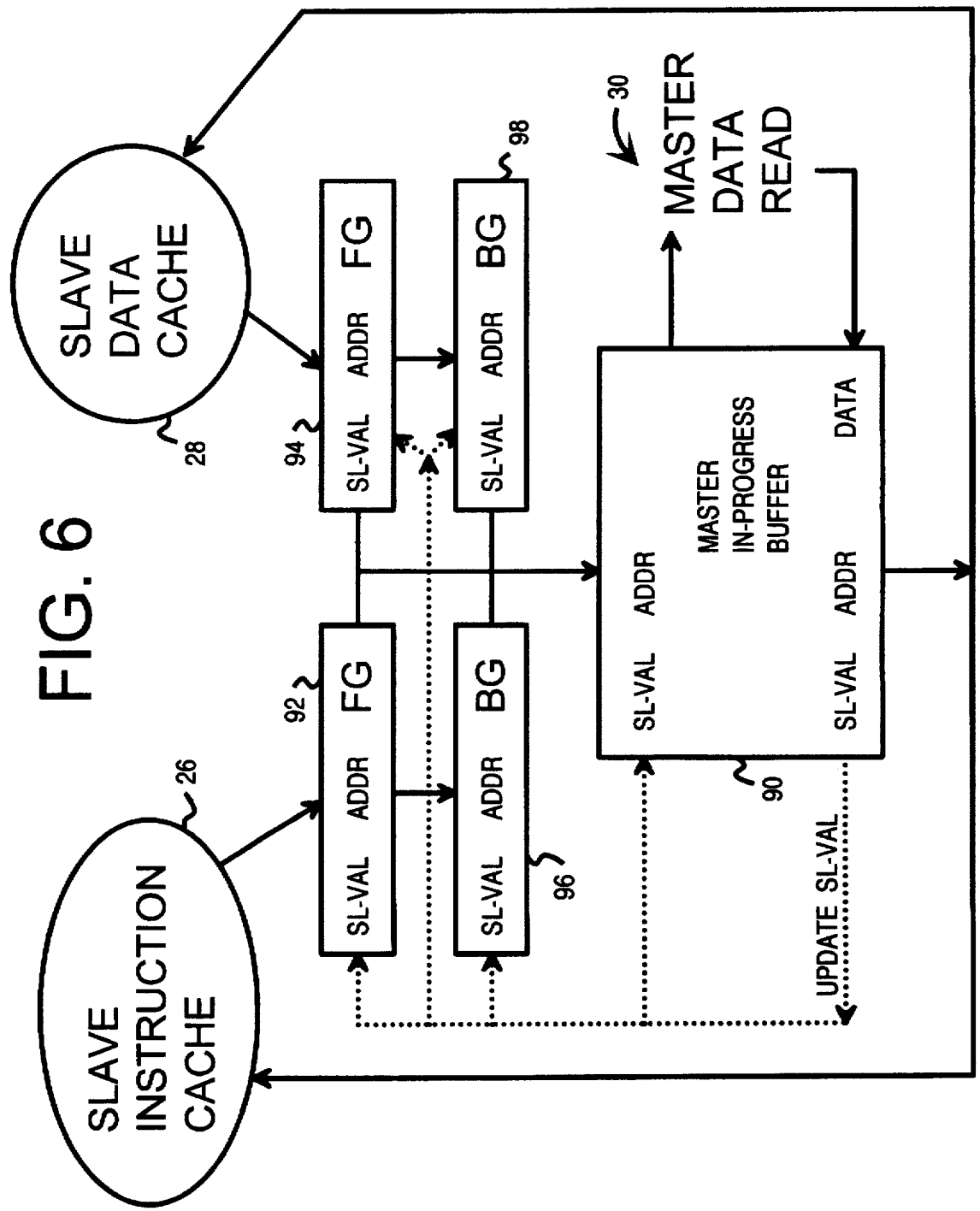
FIG. 6 details the master cache pipeline of sub-line valid bits from the slave caches, and the updating of these sub-line valid bits by pending requests in the pipeline.

FIG. 6 details the master cache pipeline of sub-line valid bits from the slave caches, and the updating of these sub-line valid bits by pending transfers in the pipeline. Slave instruction cache 26 sends requests to foreground buffer 92, while slave data cache 28 sends requests to foreground buffer 94. The information described in FIG. 3 as being sent from the slave cache to the master cache is first received by one of foreground buffers 92, 94, which may latch this information. If another request occurs before the request in foreground buffers 92, 94 can be fully processed by master cache pipeline 90, then these requests in foreground buffers 92, 94 may have to be transferred into background buffers 96, 98 before being loaded into master cache pipeline 90. Once the request enters master cache pipeline 90, the tag and data arrays of master cache 30 are accessed and the sub-line of data requested is transferred to storage buffers in master cache pipeline 90. Finally the requested sub-line of data, along with the miss address and sub-line valid bits are sent from master cache pipeline 90 to either slave instruction cache 26 or slave data cache 28, possibly through another output buffer (not shown).

Once a transfer has reached a 'commit' point in the master pipeline when it will be sent to the slave cache, then this committed transfer is compared to earlier transfers and requests and may alter these earlier transfers or requests. The miss address of the committed pending transfer which is completing or nearing completion of master cache pipeline 90 is compared to miss addresses of other requests in master cache pipeline 90, and to the miss addresses in foreground buffers 92, 94 and background buffers 96, 98.

If the compare detects a match of the slave index portion of the miss addresses, then the sub-line valid bits of the earlier requests must be updated to reflect the transfer being completed. The sub-line valid bits of earlier requests in master cache pipeline 90 of foreground buffers 92, 94 or background buffers 96, 98 are updated as described in FIG. 7.

Briefly, the old sub-line valid bits are cleared when the slave index part of the miss addresses match, but the slave tag part of the miss addresses do not match. In that instance the completing transfer over-writes the tag for the index in the slave cache so that none of the sub-line valid bits are any longer valid. The only sub-line valid bit that is set for the newer request is the sub-line valid bit for the current sub-line, which is identified by the full miss address.

When the slave index portions of the miss addresses match, and the slave tag portions of the miss addresses also match, then the completing transfer and the earlier matching request are both sub-lines for the same cache line. The sub-line valid bit corresponding to the completing transfer is set in the sub-line valid bits for the earlier matching request to reflect that another sub-line has just been written to the slave cache by the completing transfer.

A foreground register may generate four transfers for the four sub-lines of data in a line. Thus the same request in the foreground register may produce multiple transfers. A foreground and a background register cannot be to the same slave index to the same slave cache in a simplified embodiment.

Figure 7:
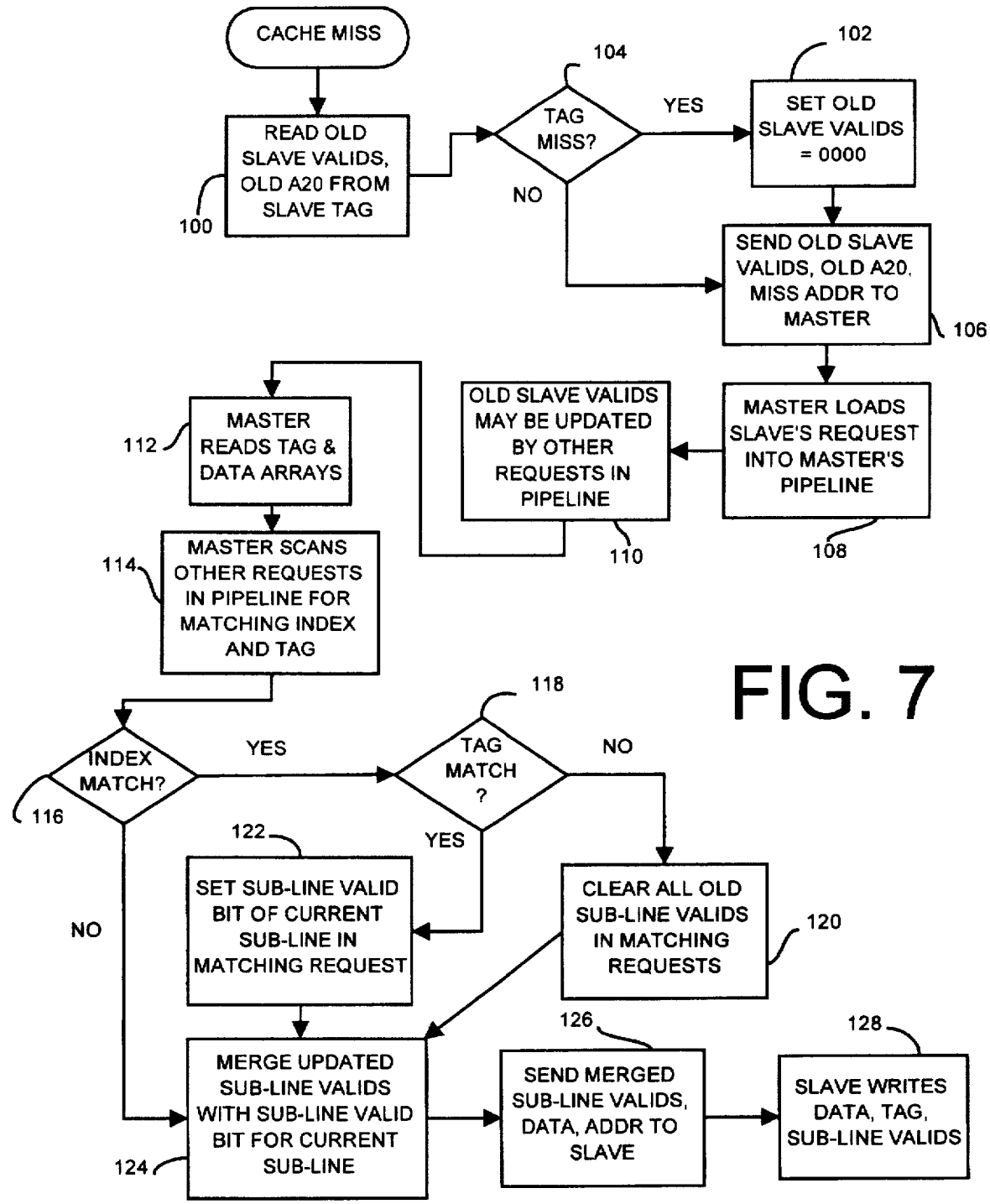
FIG. 7 is a flowchart showing how the master cache processes a slave cache miss and updates sub-line valid bits when completing the master cache's pipeline.

FIG. 7 is a flowchart showing how the master cache processes a slave cache miss and updates sub-line valid bits when completing the master cache's pipeline. A miss is detected when a slave cache is accessed and either the tag does not match the tag portion of the miss address from the CPU, or the tags match but the sub-line valid bit is cleared for the requested sub-line. The old tag, sub-line valid bits, and other information from FIG. 3 are latched when this miss is detected at the end of the slave-cache access, step 100. Thus a second read of the slave cache is not required. If the miss occurred because the tags do not match, step 104, then either the old hit bit is cleared, or preferably all the sub-line valid bits sent to the master cache are first cleared, step 102. By performing step 102 near the slave cache, the old hit bit is not necessary. If step 102 is performed near the master cache, then the old hit bit is necessary, as it instructs the master cache to first clear all the sub-line valid bits on a slave-tag miss.

If the slave tags matched, but the sub-line valid bit was cleared for the desired data, then the old sub-line valid bits are sent to the master, rather than the cleared sub-line valid bits from step 102. The miss address and the old A20 address bit from the slave's tag are also sent, step 106. The master first loads this information into a foreground buffer and then into its pipeline, step 108. As the information in loaded into the foreground register and the pipeline, its sub-line valid bits are updated to reflect any completing transfers which match the slave-index. While the request is in the master's pipeline, its sub-line valid bits may be updated by another pending or completing request in the master pipeline, step 110. Exactly how these sub-line valid bits are updated is shown in the example of FIGS. 8A, 8B. It is important that completing transfers update new requests as well as other pending requests, step 110. Otherwise, the new request entering the pipeline or foreground register might not reflect the completing request. Timing considerations may require that the completing request's tag, index, and sub-line valid bits be latched for an extra cycle so that new requests are updated properly.

The master cache's tag and data arrays are read, step 112, and the requested sub-line of data is retrieved and latched. The request is now ready to complete the master's pipeline and be returned to the slave cache. The master cache scans all other requests in its pipeline for matching miss addresses. In particular, the master cache first scans for matching index portions of the miss addresses, and then for matching tag portions of the miss addresses. For this scanning, step 114, the tag and index portions of the miss addresses are those for the slave cache rather than for the master cache. The slave's index is used because the sub-line valid bits are for a slave's cache line, not for the master's cache line. The slave's index is smaller than the master's index.

If the indexes match, step 116, and the tags also match, step 118, then the completing transfer and the matching request both are sub-lines in the same cache line. The sub-line valid bits for the earlier matching request must be updated because the completing request is going to write another sub-line to the slave cache. Thus the matching request must have its sub-line valid bits updated to reflect that another sub-line is valid. The sub-line valid bit corresponding to the sub-line of the completing request is set in the matching request. The sub-line valid bit of the completing current sub-line is set in the matching line in step 122.

The consequence of not updating the sub-line valid bits when the tags and index match is simply lower performance. The sub-line validated by the completing transfer would otherwise by invalidated by the new request. The invalidated sub-line may result in an additional miss that could have been avoided.

If the indexes match, step 116, but the tags do not match, step 118, then the completing transfer and the earlier matching request share the same index in the slave cache, but they are different cache lines having different tags. Since the slave cache is direct-mapped, the earlier matching request eventually replaces the completing transfer for the shared slave index. However, none of the other sub-lines are valid for the matching request. Thus all of the sub-line valid bits in the earlier request must be cleared, step 120.

The updated sub-line valid bits for the completing transfer are then merged with the current sub-line valid bits, step 124. The merge is simply a bit-wise logical OR operation on the active-high sub-line valid bits. The current sub-line valid bits are a 4-bit field with all bits cleared except the one sub-line valid bit for the current sub-line being requested. These current sub-line valid bits are never updated; the old sub-line valid bits read from the slave cache are the sub-line valid bits that are updated. The old sub-line valid bits are updated earlier in the pipeline as the matching request, step 110. A request traveling down the master's pipeline first becomes the 'matching request' in step 110, when its sub-line valid bits may be updated, and then when the request reaches the last stage of the master's pipeline it becomes the 'completing transfer' which has its index and tag compared against all other requests in the pipeline. At this point, the transfer is committed to be sent to the slave cache. Before this point in the pipeline a possibility exists of canceling the transfer, such as when the master cache misses and main memory must be accessed.

The merged sub-line valid bits, along with the miss address and the retrieved sub-line of data, are sent to the slave cache, step 126. The slave then completes the miss processing by writing this sub-line of data, along with the tag portion of the miss address and the merged sub-line valid bits at step 128.

The test to determine if the indexes match, step 116, and the tags match, step 118, and setting a sub-line valid bit in a matching line, step 122, or clearing all sub-line valid bits, step 120, are all performed multiple times or in parallel on all possible matching requests in the master's pipeline.

EXAMPLES OF OPERATION OF MASTER PIPELINE

FIGS. 8A, 8B show various requests flowing down the master cache's pipeline, with the slave's sub-line valid bits being updated. As shown in this example, the master pipeline is a linear, 4-deep pipeline having four stages. Many other arrangements of this pipeline are possible, and indeed two or more pipelines may be constructed.

At the start of cycle 1 of FIG. 8A, the master pipeline has already been running and contains four pending requests. In the top stage, stage 1, the newest request has a miss address of 0x3018 in hexadecimal notation. This miss address is a byte address, as shown in FIG. 4. The tag address is 0x6 hex, while the index portion of the miss address is 0. The fourth sub line is the current sub line since the 5th and 4th LSBs (A27, A28) of byte address 0x3018 are 11. The current sub-line field for this address in stage 1 is thus set to 1000. The old sub-line valid bits received from the slave cache are all cleared, as this was a slave-tag miss.

In stage 2 of cycle 1 miss address 0x0038 has a tag portion of 0 and an index portion of 1. Its old sub-line valid bits from the slave cache are 0010. In stage 3, address 0x0000 has a tag of 0 and an index of 0, but its old sub-line valid bits are 1110. Address 0x0000 is the address of the first sub-line in index 0, so its current sub-line is set to 0001 (a one-hot encoding is used).

Stage 4 contains the completing request, address 0x0030. Its line index of 1 is compared to the line indexes of the requests in stages 1, 2, and 3 in a parallel comparison. Stages 1 and 3 have an index of 0 and thus do not match. However, stage 2 also has an index of 1 and thus stage 2 contains a matching request to the completing request in stage 4. The tag portions of the addresses in these stages 2, 4 also match since both tags are 0. Thus step 120 of FIG. 7 causes the sub-line valid bit in the matching request of stage 2 to be set. Since the completing request in stage 4 has a current sub-line of 2 (0100), sub-line 2's valid bit is set in the old sub-line valid bits for the matching request in stage 2. This can be seen in the next cycle 2 for this matching address 0x0038 where the old sub-line valid bits have changed from 0010 in cycle 1 to 0110 in cycle 2 as the matching request in stage 2 moves down the pipeline to stage 3 in cycle 2.

A the end of cycle 1 the completing request in stage 4 is sent to the slave cache and purged from the master's pipeline. The old sub-line valid bits 0010 , which may have been updated, are merged or logically ORed with the current sub-line 0100 for the completing request in stage 4. The merge's result of 0110 is sent to the slave cache to be written into the slave's sub-line valid field for index 1.

At the transition between cycles 1 and 2, the completing request in stage 4 is purged after being sent to the slave cache, and the other pending requests in stages 1, 2, and 3 are staged down the master's pipeline to stages 2, 3, and 4. A new request enters the master's pipeline in stage 1. This new request is also to line index 0 with a tag of 0, but to the fourth sub-line. The completing request in stage 4 is also to line index 0 and has a tag of 0; thus the completing request in stage 4 matches the matching request in stage 1.

The completing request in stage 4, cycle 2 has another matching request in stage 2. While the indexes match as both are 0, the tags do not match. The sub-line valid bits for the matching request in stage 2 must therefore be cleared, although they were already cleared by the slave before entering the master's pipeline.

The competing request's old sub-line valid bits (1110) are merged with the current sub-line bits (0001) before being written to the slave cache and purged from the master's pipeline. Since this completing request is writing the last sub-line to the slave cache, all of the sub-line valid bits are set (1111).

In FIG. 8B, cycle 3, another new request has entered the pipeline in stage 1. This new request has both an index and a tag that matches the completing request in the final stage 4. Since the current sub-line also matches, the request in stage 1 is redundant. A redundant request can occur when a cache re-misses on the same data item which is already in the process of being transferred to the slave cache, but has not yet completed. Perhaps the completing request in stage 4 was actually a master-initiated prefetch and the request in stage 1 was a slave cache miss that the prefetcher correctly anticipated. Since these requests are redundant, the request in stage 1 can be removed from the master pipeline, or it can be left in the pipeline but the transfer to the slave suppressed.

In cycle 4 a bubble exists in the master's pipeline at stage 2 since the redundant request detected in cycle 3 was removed or suppressed. The new completing request, to address 0x3018, has an index of 0 and a tag of 6. Both the index and the tag match the request in stage 1. The third sub-line valid bit in the old sub-line valid bit field of stage 1 is set since the completing request writes the third sub-line to the slave. Thus the matching request in stage 1 has its sub-line valid bits updated.

The index of the completing request also matches the index of the matching request in stage 3, but the tags do not match. All of the old sub-line valid bits for the matching entry in stage 3 must be cleared. In the next cycle 5 only the sub-line valid bit for the current sub-line is set for this request when merged with these cleared old sub-line valid bits.

In cycle 5 the competing request matches both the tag an index of the new request in stage 1. However, the current sub-line of stage 1 is for the slave data cache, while the completing request in stage 4 is to the slave instruction cache. Thus no match has occurred, and the sub-line valid bits are not altered.

The completing request in cycle 5 also matches the index but not the tag in stage 2. Thus all the old sub-line valid bits in stage 2 are cleared. The example of FIGS. 8A, 8B has shown that transfers of data to slave caches may be interleaved with other transfers or requests in any arbitrary manner. A complete cache line need not be fully transferred before other cache lines are transferred. Transfer of one cache line may be interrupted by a request for another cache line even after only one sub-line has been transferred.

PREFETCHING AND OTHER REQUESTS

The requests have been described as being generated from a slave cache when the CPU's pipelines miss in the slave cache. Other sources of requests are also possible, such as external snoop and invalidate requests. The D/I bit may be expanded to encode the source of the request, including external sources.

The master cache may also support prefetching. The master cache initiates prefetching requests rather than the slave caches. Since the slave does not initiate the prefetch, the master does not have the sub-line valid bits from the slave cache. If it is known that the prefetched data does not reside in the slave caches, then the master can initialize the sub-line valid bits to 0000 before merging in the valid bit for current sub-line. If it is not known whether the prefetched data resides in the slave cache, the master can read the master cache's tags to determine if the cache line resides in the slave. If a slave-valid bit is set, the prefetch is not necessary.

Another alternative is for the master cache not to prefetch into the slave cache at all, but only prefetch from external memory into the master cache. This may have better performance and is a simpler approach.

ADVANTAGES OF THE INVENTION

The major benefits of sub-line validity are provided by having sub-line valid bits only stored in the smaller slave caches. Transfers of cache lines can be arbitrarily interrupted and re-started. Indeed, partially-transferred cache lines may be left in the slave cache indefinitely or replaced before the remainder of the cache line is transferred.

Another benefit of sub-line validity is that parity errors occurring during a transfer from master to slave do not cause the remaining sub-lines to become invalid in the slave cache. Slave Does Not Update or Manage its Own Valid Bits The slave's sub-line valid bits are temporarily used by the master cache during data transfers. The master cache does not have to store sub-line valid bits for each of the many, many cache lines in the master cache, greatly reducing cost. On the other hand, the complexity of the slave caches is not significantly increased, as the master cache handles the complexity of updating the slave's sub-line valid bits. The master almost completely manages the slave's sub-line valid bits, as the slave just blindly writes the sub-line valid bits generated by the master cache's pipeline. The slave does not set or clear its own valid bits; it must have its valid bits written by the master. From the slave's perspective, its own sub-line valid bits are mere data, except that they are used to validate a slave-tag match. Thus the slave caches are kept simple while the master cache handles the more complex tasks of the management of the sub-line valid bits.

Data is transferred to the slave caches in the order it is requested, rather than in a fixed or semi-fixed order used by an algorithm which transfers an entire cache line at once. Even if additional hardware is provided to interrupt such a semi-fixed transfer, the order the sub-lines are transferred to the slave cache is determined by the algorithm and possibly the first sub-line requested. Other sub-lines are transferred in the order determined by the algorithm, not the order required. In contrast, the invention transfers the sub-lines in the order requested, independent of any semi-fixed ordering algorithm. The order transferred is not fixed by a line-miss algorithm in the cache control logic, but is a seemingly arbitrary order dependent only upon the order that the sub-lines miss and the available free cycles in the master cache's pipeline. The order appears to be different for different cache lines transferred: some lines are transferred with the sub-lines in sequence (0,1,2,3), while other lines are transferred in seemingly arbitrary order (0,3,2,1; 3,1,0,2; 0,1,3,2; etc.). Some lines are never completely transferred (0,1,2; 2,3,0; 2,0; etc.).

The master cache can invalidate a line in the slave cache by writing all of the slave's sub-line valid bits as zeros in an otherwise normal master-initiated transfer cycle to the slave cache. Slave invalidations can occur after a snoop hit in the master when the data is also in the slave cache.

A SIMPLIFIED, PREFERRED EMBODIMENT

The invention has been described in a general manner, where a committed transfer about to complete the master's pipeline is compared to all earlier transfers and requests. Any earlier matching transfer or request may be altered when the slave-indexes match. The sub-line valid bits of the earlier request or transfer are cleared when the tags mismatch, but an additional sub-line valid bit is set when the tags match.

Rather than compare all earlier requests, a simplified embodiment only compares the committed transfer to the transfer in the previous stage of the master's pipeline. Other earlier requests are not compared to the committed transfer. Instead, all requests being loaded into the foreground registers are compared to all transfers that are past the commit point of the master's pipeline. The sub-line valid bits are altered as the new request is being loaded into the foreground register to account for the committed transfers still in the master's pipeline.

A foreground register may generate four transfers for the four sub-lines of data in a line. Thus the same request in the foreground register may produce multiple transfers. A foreground and a background register cannot be to the same slave index to the same slave cache in the simplified embodiment. The sub-line valid bits in the foreground register are based on the current state of the sub-line valid bits in the slave cache, but are updated for transfers in progress past the commit point.

When the slave-index matches for the one-stage comparison at the commit point in the master pipeline, the immediately-preceding transfer has its sub-line valid bits altered. When the slave-tags do not match, these sub-line valid bits are cleared, but when the slave-tags do match, then the preceding transfer has one more sub-line valid bit set for the committed transfer.

ALTERNATE EMBODIMENTS

Several other embodiments are contemplated by the inventors. For example separate master cache pipelines may be constructed for the slave instruction and slave data caches. Requests from other sources besides the slave caches can be mixed in with slave requests in the master pipeline. These other sources can include external snoop or invalidate requests, other processors or I/O devices, stores to the master cache, and other caches. In these cases the 'miss' address is not strictly caused by a miss. Requests such as snoops that do not cause data transfers must not update sub-line valid bits of other requests while in the master's pipeline. A subsequent invalidate caused by a snoop hit has to modify other sub-line valid bits.

The master cache's pipeline has been described as a four-stage pipeline, but deeper or shallower pipelines may also be used. Even a simple one-stage pipeline can be used. While for simplicity the requests in the master pipeline have remained in order, some higher-priority requests may bypass lower-priority requests in the pipeline to achieve more efficient processing. Foreground and background registers are just one of many ways to track incoming requests, and indeed these registers or buffers may be deleted in favor of other means of tracking and processing requests. A foreground or background register may source several transfer requests. A line miss in the foreground register can generate four sub-line requests in order to fetch the entire line into the slave cache.

The master's pipeline may be split into separate pipelines for accessing the master's tags and the master's data, as the tags and data are often in separate data arrays. The master cache could also contain a secondary tag RAM array for keeping a copy of the slave's sub-line valid bits and tags to expedite processing.

The master cache may use a single bus to communicate with both the slave caches. In that case, busses 33, 35 of FIG. 1 are combined together into a single bus. Another improvement is not to store slave valid bits for each of the associates in each set. For an 8way set-associative master cache storing slave instruction cache and slave data cache valid bits in each set, 16 bits are needed for each set. Instead, a single structure is shared by all lines in each set. The shared structure is known as a use record. The use record encodes the 8 slave instruction cache valid bits into 4 bits: a single slave instruction valid bit, and a 3-bit field that encodes the block number of the line containing the activated slave instruction cache valid bit. No more than one line may have its data in the slave instruction cache because the slave instruction cache is direct-mapped, having only one entry for the index. The use record thus reduces the number of bits for the slave valid bits from 16 to 8 for a master having two slave caches. Least-recently- used bits can also be located in the use record.

When both the index and tag portions of the miss addresses match, then a single additional sub-line valid bit is set in the matching request. The single additional sub-line valid bit is the valid bit for the current sub-line of the completing request. Another method is to set all sub-line valid bits for the matching request that are set in the completing request. The completing request may have other sub-line valid bits set that are not set in the matching request; these other sub-line valid bits are not the current sub-line valid bit. This may occur if the requests are processed out-of-order.

The slave cache may simply clear all sub-line valid bits for a miss with a tag mismatch.

The master cache then does not have to clear these sub-line valid bits, and some of the hit status bits from the slave to the master can be deleted.

The current sub-line valid bit field in the master cache's pipeline was described as having a one-hot encoding of the current sub line indicated by the miss address. Other encodings may also be used for the current sub-line field, and indeed the miss address itself can be decoded at the end of the pipeline to supply the valid bit for the current sub-line, eliminating the need for the current sub-line field. The entire 32-bit address need not be sent to the master cache as all reads are 8 bytes in size. Other address sizes may also be included.

Cache read cycles are the predominant cycle type, but writes from the CPU may also be accommodated. The slave data cache may have an allocate-on-write policy where a new cache line is transferred to the slave data cache when a CPU write misses in the slave data cache. A simpler alternative is to not allocate on write but only on CPU reads. When writes can be less than a full sub-line, enables for the bytes of a sub-line that are written need to be used.

The invention has been described as comparing the index and tag portions of the completing transfer to all other requests in the pipeline, and modifying the sub-line valid bits of those other requests and not the completing request. In another embodiment the last stage is not the stage being compared to all the other stages. Instead the second to the last stage is compared to all earlier stages, and to the final stage. Sub-line valid bits in the earlier stages are updated as described, but the final stage is not updated. Instead the second to the last stage is updated when a match occurs with the final stage. This embodiment has a speed and performance advantage over other embodiments since the comparisons are performed before the speed-critical last stage of the master's pipeline. Indeed the comparisons may themselves be pipelined, with the compares occurring in one clock cycle but the updating of the sub-line valid bits occurring in a following clock cycle, perhaps after the requests have been staged down the master pipeline. Pipeline stalls may also occur as is well-known in the art.

Dummy or shadow pipeline stages may exist after the data array has been read. These shadow stages allow for comparisons of transfers that have already left the master cache, and are being written to the slave cache. These shadow stages may include a stage after the transfer has written to the slave cache to allow for the delay for new requests to be transmitted to the master cache.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A master-slave cache system comprising:

a master cache for storing data from a memory, the master cache being arranged as a plurality of cache lines each containing a cache line of data, wherein a datum in the master cache is only valid when all data in an entire cache line containing the datum is present in the master cache, the master cache not allowing a subset of the cache line to be valid;

a slave cache for supplying data to a pipeline of a processor, the slave cache being arranged as a plurality of cache lines each containing a cache line of data, wherein a single datum in a first cache line in the plurality of cache lines is capable of being valid when other data in the first cache line are not valid, the slave cache allowing a subset of any cache line to be valid;

slave sub-line valid means coupled to each cache line in the slave cache, for indicating a valid portion of a cache line which contains valid data and for indicating an invalid portion of the cache line which does not contain valid data, the invalid portion of the cache line not being useable by the pipeline of the processor; and transfer means, coupled between the master cache and the slave cache, for transferring a datum comprising a sub-line of data for a requesting cache line from the master cache to the slave cache, the transfer means including sub-line valid transfer means, coupled to the slave sub-line valid means, for transferring to the master cache a sub-line valid indication of the valid portion of the requesting cache line, whereby the sub-line valid indication of the valid portion of the requesting cache line in the slave cache is sent from the slave cache to the master cache.

2. The master-slave cache system of claim 1 further comprising:

update means, in the master cache, receiving the sub-line valid indication from the slave cache, for updating the sub-line valid indication to generate an updated sub-line valid indication, the updated sub-line valid indication having an indication of an additional portion of the requesting cache line being valid when an other pending request in the master cache is a request to transfer the additional portion of the requesting cache line to the slave cache, whereby the sub-line valid indication is sent from the slave cache to the master cache, the master cache updating the sub-line valid indication for the additional portion of the requesting cache line transferred by the other pending request.

3. The master-slave cache system of claim 1 wherein the sub-line valid indication from the slave cache comprises a plurality of sub-line valid bits, each sub-line valid bit in the plurality of sub-line valid bits for indicating when a sub-line portion of the cache line contains a valid datum.

4. The master-slave cache system of claim 2 wherein the transfer means further comprises:

return means for returning data from the master cache to the slave cache, the return means also returning to the slave cache the updated sub-line valid indication from the update means, the slave cache including means for writing the returning data and means for writing the updated sub-line valid indication to the slave cache in response to the return means.

5. The master-slave cache system of claim 4 wherein the transfer means further comprises:

address transfer means for transferring a miss address from the slave cache to the master cache, the miss address comprising (a) a slave-index portion for selecting a selected cache line in the slave cache and (b) a slave-tag portion of the miss address for comparing to a slave-tag stored with the selected cache line in the slave cache, wherein a miss occurs when the slave-tag portion does not match the slave-tag stored in the slave cache with the selected cache line, the miss also occurring when data identified by the miss address is in the invalid portion of the cache line.

6. The master-slave cache system of claim 5 wherein the update means in the master cache comprises:

slave-index compare means receiving a pending miss address for the other pending request in the master cache and receiving the miss address for the requesting cache line from the transfer means, for comparing a slave-index portion of the pending miss address to the slave-index portion of the miss address, the update means updating the sub-line valid indication when a slave-index match is detected but not updating the sub-line valid indication when no match is detected, whereby the sub-line valid indication from the slave cache is updated in the master cache when slave-index portions of miss addresses match.

7. The master-slave cache system of claim 6 wherein the update means in the master cache further comprises:

slave-tag compare means receiving the pending miss address for the other pending request in the master cache and receiving the miss address from the transfer means, for comparing a slave-tag portion of the pending miss address to the slave-tag portion of the miss address; and wherein (a) the update means includes means for validating the sub-line valid indication for the additional portion of the requesting cache line when a tag match is detected and the slave-index match is detected;

(b) the update means includes means for invalidating the sub-line valid indication for portions of the cache line other than a portion identified by the miss address when the slave-index match is detected but the tag match is not detected;

(c) the update means not updating the sub-line valid indication when the slave-index match is not detected, whereby the slave-index match and the tag match determine how the sub-line valid indication is updated in the master cache before being returned to the slave cache.

8. The master-slave cache system of claim 7 wherein data includes instructions and operands, the pipeline comprises an instruction pipeline and an execution pipeline, the slave cache comprising:

a slave instruction cache for supplying instructions to the instruction pipeline of the processor, the slave cache being arranged as a plurality of cache lines each containing a cache line of instructions, wherein a single instruction in a first cache line is capable of being valid when other instructions in the first cache line are not valid, the slave instruction cache allowing a subset of any cache line to be valid; and a slave operand cache for supplying operands to the execution pipeline of the processor, the slave cache being arranged as a plurality of cache lines each containing a cache line of operands, wherein a single operand in a second cache line is capable of being valid when other operands in the second cache line are not valid, the slave operand cache allowing a subset of any cache line to be valid.

9. The master-slave cache system of claim 8 further comprising a plurality of slave-instruction-cache valid indicators, in the master cache, for indicating that at least a portion of a corresponding slave cache line in the slave instruction cache contains valid data, the corresponding slave cache containing data also present in a corresponding master cache line in the master cache, the plurality of slave-instruction cache indicators also identifying a location in the master cache of the corresponding master cache line, whereby the plurality of slave-instruction-cache valid indicators in master cache contain information on a subset of cache lines in the master cache having a corresponding slave cache line in the slave cache containing a copy of at least a portion of the data in the corresponding master cache line.

10. The master-slave cache system of claim 9 further comprising:

locating means for locating the corresponding master cache line for the miss address of the requesting cache line from the slave cache;

means for modifying a slave-instruction-cache valid indicator for the corresponding master cache line identified by the locating means, the means for modifying including means for resetting the slave-instruction-cache valid indicator when the miss occurred because the slave-tag in the slave cache did not match the slave-tag portion of the miss address.

11. The master-slave cache system of claim 10 wherein the transfer means further comprises:

means for transferring an overlapping master-index portion of the slave-tag from the slave cache to the master cache, the overlapping master-index portion of the slave-tag being a portion of the slave-tag which contains master-index address bits which are used to select a cache line in the master cache, wherein the master cache uses more bits in the miss address for selecting a cache line in the master cache than a number of bits used by the slave cache to select a cache line in the slave cache, the master-index having more address bits than the slave-index.

12. The master-slave cache system of claim 11 wherein the transfer means further comprises:

means for transferring a block number stored with the corresponding slave cache line in the slave cache to the master cache, wherein the master cache comprises a set-associative cache having a plurality of associate blocks, wherein the master-index portion of the miss address selects a plurality of cache lines, the master-index portion selecting a cache line from each block in the plurality of associate blocks, wherein the locating means receives the block number from the transfer means, the locating means including means for selecting a corresponding block from the plurality of associate blocks in the master cache, wherein the return means further comprises block means for transmitting an identification of a current block in the plurality of associate blocks, the current block containing the data from the master cache to the slave cache returned by the return means, the slave cache also including means for writing as the block number the identification of the current block in the plurality of associate blocks, for writing the block number to the slave cache in response to the return means, whereby the slave cache stores as the block number the identification of the current block in the master cache and sends this block number to the master cache to aid in identifying a location of the corresponding master cache line.

13. A method of processing a cache miss in a master-slave cache comprising the steps of:

detecting the cache miss in a slave cache which receives a miss address from a processor, the miss address having a slave-tag portion and a slave-index portion, selecting a selected cache line in the slave cache using the slave-index portion;

reading old sub-line valid bits from the selected cache line;

invalidating the old sub-line valid bits transmitted to a master cache when the slave-tag portion does not match a slave-tag stored in the selected cache line;

transmitting the miss address and the old sub-line valid bits from the slave cache to the master cache;

updating the old sub-line valid bits transmitted to the master cache when other pending transfers in the master cache have a slave-index portion of a pending miss address that matches the slave-index portion of the miss address and generating updated sub-line valid bits;

reading a sub-line of data located at the miss address from a data array in the master cache;

receiving other new requests after the miss address is received;

scanning the other new requests for a matching new request having a new miss address with a slave-index portion that matches the slave-index portion of the miss address;

comparing the slave-tag portion of the new miss address for a matching new request to the slave-tag portion of the miss address and signaling a slave-tag match when slave-tag portions match;

invalidating sub-line valid bits for the matching new request when the slave-tag match is not signaled for a matching line;

validating an additional sub-line valid bit for the matching line when the slave-tag match is signaled for the matching line, the additional sub-line valid bit corresponding to the sub-line indicated by the miss address;

sending the sub-line of data from the data array in the master cache to the slave cache and sending the updated sub-line valid bits to the slave cache; and writing the sub-line of data and the updated sub-line valid bits to the selected cache line in the slave cache, whereby the sub-line valid bits in the slave cache are updated by the master cache.

14. The method of claim 13 further comprising the step of:

setting a current sub-line valid bit in the updated sub-line valid bits, the current sub-line valid bit being for a current sub-line indicated by the miss address.

15. The method of claim 13 wherein the slave cache does not write to its own sub-line valid bits except in response to the master cache sending the updated sub-line valid bits to the slave cache, whereby the slave cache cannot update its own sub-line valid bits unless directed by the master cache.

16. The method of claim 15 wherein the step of reading the sub-line of data located at the miss address from the data array in the master cache includes the step of reading a master-line valid bit for a master-cache line containing the sub-line of data, the master-line valid bit indicating when the entire master-cache line is valid, the master cache not allowing a partial cache line containing just one sub-line of data to be read, the master cache only allowing a full cache line to be valid.

17. The method of claim 15 wherein sub-lines of data are transferred from the master cache to the slave cache in a sequence determined by the processor generating miss addresses to sub-lines.

18. A cache system comprising:

a master cache having a plurality of master cache lines, each master cache line having all sub-lines of data valid for access or all of the sub-lines of data not valid for access;

a slave cache, coupled to the master cache and coupled to a processor, having a plurality of slave cache lines, each slave cache line having a plurality of sub-lines of data individually marked valid or invalid by sub-line valid bits for each slave cache line;

a slave miss requester, detecting when a requested data item is not present in the slave cache, for transmitting a miss address and sub-line valid bits from the slave cache to the master cache;

a transfer pipeline in the master cache, receiving the miss address and the sub-line valid bits from the slave miss requester, for reading the requested data item from the master cache and updating the sub-line valid bits; and a slave writer, receiving the miss address, the requested data item, and the sub-line valid bits updated by the transfer pipeline, for writing the requested data item, a tag portion of the miss address, and the sub-line valid bits updated by the transfer pipeline to a selected cache line in the slave cache, the selected cache line selected by a slave-index portion of the miss address, whereby although the master cache does not have sub-line validity, the master cache updates the sub-line valid bits received from the slave cache and has updated sub-line valid bits written back to the slave cache with the requested data item.

19. The cache system of claim 18 wherein the transfer pipeline in the master cache includes compare means for comparing in parallel a slave-index portion of the miss address for a request in the transfer pipeline to slave-index portions of other requests in the transfer pipeline, the transfer pipeline updating the sub-line valid bits when the compare means detects a match in the slave-index portions.

20. The cache system of claim 19 wherein the slave cache is a direct-mapped cache while the master cache is a set-associative cache, the master cache being larger than the slave cache, the master cache processing external snoop requests that hit in the slave cache by writing an invalid cache line to the slave cache, the invalid cache line having all sub-line valid bits marked as invalid.

21. The cache system of claim 18 wherein the plurality of sub-lines of data are transferred from the master cache to the slave cache in an arbitrary order, the arbitrary order being a different order for different lines in the slave cache.

* * * * *